Feb. 18, 1930.                K. E. LYMAN                 1,747,373
                         BRAKE OPERATING MECHANISM
                            Filed May 5, 1927

INVENTOR
KENNETH E. LYMAN
BY
*Jn. W. McConkey*
ATTORNEY

Patented Feb. 18, 1930

1,747,373

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE-OPERATING MECHANISM

Application filed May 5, 1927. Serial No. 188,979.

This invention relates to brakes and is illustrated as embodied in novel operating mechanism for a front wheel automobile brake. An object of the invention is to provide simple, automatically-operating means for adjusting the brake to compensate for wear of the brake lining.

In one desirable arrangement the brake is applied by a thrust member such as a nut engaging an operating arm on the shaft for the cam or other brake-applying means, the nut or its equivalent being automatically operated as the lining wears to shift it toward the axis of the shaft so that it wedges the brake-applying arm toward its applied position, thus compensating for the wear of the brake. In the arrangement shown in the drawing, the nut or its equivalent is operated by a ratchet or the like having an operating part engaged by a pawl or stop which becomes operative when excessive wear permits undue movement of the brake-operating mechanism.

The above and other objects and features of the invention, including various novel combinations of parts and desirable particular constructions, will be apparent from the following description of two illustrative embodiments shown in the accompanying drawing, in which.

Figure 1:
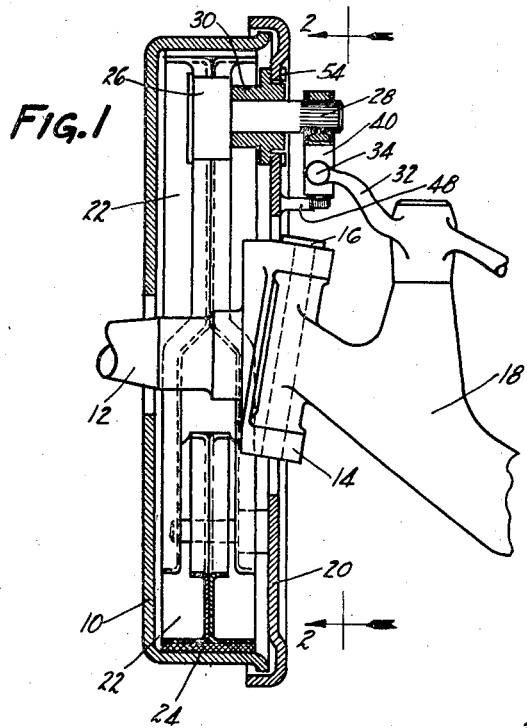
Figure 1 is a vertical section through one front brake and through associated parts.
Figure 2:
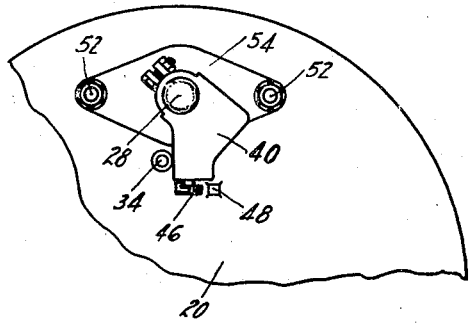
Figure 2 is a partial elevation of the upper part of the brake looking in the direction of the arrows 2—2 in Figure 1.

The brake illustrated in Figure 1 includes a drum 10 rotating with a wheel (not shown) on the spindle 12 of a knuckle 14 swivelled by a king-pin 16 or the like at one end of an axle 18. The open side of the drum 10 is closed by a backing plate 20 secured in any desired manner to the knuckle 14. The brake proper includes shoes 22 having lining 24 engaging the brake drum when the brake is applied, the shoes being forced against the drum by suitable applying means such as a cam 26 on a shaft 28 journalled in a supporting bracket 30, the shaft 28 being illustrated in this particular arrangement as operated by a generally horizontal lever 32 fulcrumed on the axle 18, and having at its outer end an integral ball 34 which is arranged when the brake is applied with its center in or immediately adjacent the swivelling axis of the wheel (that is, the axis of the king-pin 16).

The present invention relates to the adjustment of the brake to compensate for the wear of the brake lining 24, the adjustment in the illustrated embodiments being incorporated in the means through which the shaft 28 is operated by the lever 32 or its equivalent.

Figure 3:
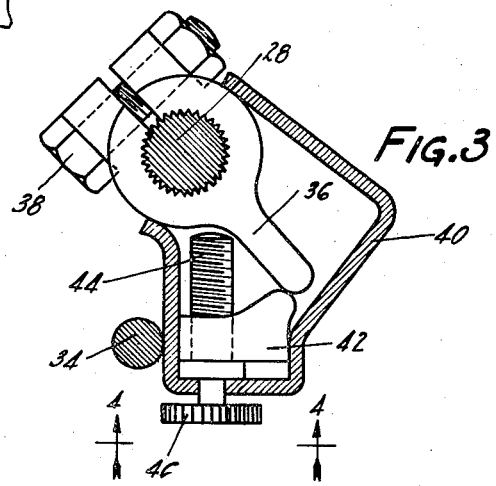
Figure 3 is a vertical section through the automatically adjusted brake-operating mechanism.

In the arrangement of Figure 3, an operating arm 36 is clamped on the end of the shaft 28 by a suitable clamp screw 38, the end of the shaft being serrated if desired to prevent the arm from shifting on the shaft. A housing or hollow arm 40 inclosing the operating arm 36 is loosely mounted on the shaft 28 so that it can turn with respect to the shaft and with respect to the arm 36. The housing or hollow arm 40 is formed on its rear side with a plane thrust surface engaged by the ball 34 at the end of the lever 32.

Within the lower part of the housing or hollow arm 40 is a thrust member such as a nut 42 which is held from turning by being embraced by the walls of the hollow arm 40, and which is threaded on a worm or equivalent operating device 44 which is arranged radially with respect to the shaft 28.

Figure 4:
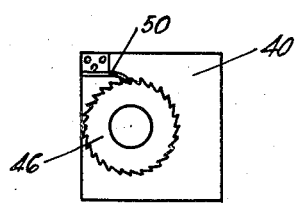
Figure 4 is a bottom plan view of the mechanism shown in Figure 3.

In the arrangement of Figures 3 and 4, a ratchet 46 is fixed on the end of the worm 44 outside the housing or hollow arm 40, in such a position that at the end of the normal brake-applying stroke of the mechanism one of the teeth of the ratchet will be engaged by a pawl 48 (Figure 1) which is actuated by further brake-applying movement of the mechanism to turn the worm a distance corresponding to one tooth of the ratchet 46 and thus shift the nut 42 upwardly in such a manner as to wedge the arm 36 toward the right in Figure 3. This turns the shaft 28 and the cam 26 to take up for the excess movement of the mechanism due to the wear of the brake lining. If desired, a spring 50 may be provided to prevent reverse movement of the ratchet 46, although normally the friction of the parts is ample to prevent such reverse movement.

If the bracket 30, with the cam 26 and the shaft 28, is mounted so as to shift with its attaching bolts 52 to permit the cam 26 to center itself, as described in Dodge Patent No. 1,604,394, granted October 26, 1926, a plate 54 may be mounted on the bolts 52 to shift with the bracket and the shaft, and in that case the pawl 48 is mounted on the plate 54 so that the pawl also shifts with the other parts.

Figure 5:
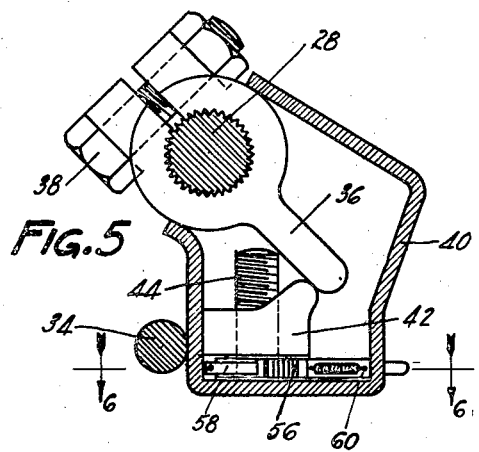
Figure 5 is a view corresponding to Figure 3 but showing a modified form of adjusting means.
Figure 6:
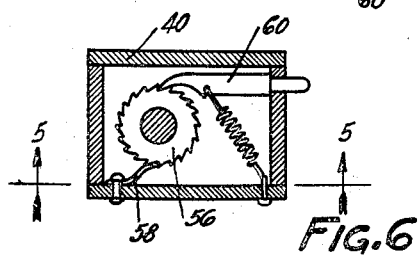
Figure 6 is a horizontal section through Figure 5 on the line 6—6 showing the novel adjusting means.

In the arrangement of Figures 5 and 6, a ratchet 56, corresponding to the ratchet 46, and provided with a retaining spring 58 if desired, is arranged inside of the housing or hollow arm 40 and is provided with a spring-held plunger 60 having a portion extending outside of the housing for engagement with the pawl 48.

While the element 48 has been referred to above as a pawl, it may also be regarded as a fixed stop which determines the movement of the brake-applying mechanism before which the automatic adjustment comes into play.

While two illustrative embodiments of the invention have been described in detail, it is not my intention to limit its scope to those particular embodiments or otherwise than by the terms of the appended claims.

I claim:

1. Brake-operating mechanism comprising, in combination, a brake-applying shaft, an arm fixed on the shaft, an operating device, a thrust member carried by said device and operatively engaging said arm, and means for automatically shifting said member toward the axis of the shaft to compensate for wear of the brake.

2. Brake-operating mechanism comprising, in combination, a brake-applying shaft, an arm fixed on the shaft, an operating device, a worm carried by said device and arranged radially of said shaft, and a thrust nut threaded on the worm and engaging the arm and which is adjustable toward the axis of the shaft to compensate for wear of the brake.

3. An adjustment for brake mechanism comprising, in combination with a rotatably supported brake shaft, a pair of relatively angularly arranged arms mounted on the shaft, one arm being fixed to the shaft and the other arm being angularly adjustable thereover and with respect to the first arm, a rotatable element carried by the adjustable arm extending radially toward the shaft, a part mounted upon said rotatable element for advancement thereover toward the shaft upon rotation of the element, said part adapted to exert a thrust on the fixed arm to vary the relative angular relationship of the two arms.

4. An adjustment for brake mechanism comprising, in combination with a rotatably supported brake shaft, a pair of relatively angularly arranged arms mounted on the shaft, one arm being fixed to the shaft and the other arm being angularly adjustable thereover and with respect to the first arm, a worm rotatably supported by the adjustable arm and located wholly upon one side of the fixed arm, a nut threaded upon the worm to be advanced outwardly thereover upon rotation of the worm to exert a thrust upon the fixed arm to vary the relative angular relationship of said arms.

5. An adjustment for brake mechanism comprising, in combination with a rotatably supported brake shaft, a pair of relatively angularly arranged arms mounted on the shaft, one arm being fixed to the shaft and the other arm being angularly adjustable thereover and with respect to the first arm, said adjustable arm being in the form of a housing enclosing the fixed arm, a worm rotatably journaled within the wall of the adjustable arm and extending radially toward the shaft and provided with a ratchet adjacent said wall, an operating pawl engaging said ratchet to actuate the same to rotate the worm, means adapted to be engaged by said pawl to actuate the ratchet upon a determined angular swinging of the adjustable arm, a nut threaded upon the worm adjacent the ratchet to be advanced outwardly over the worm toward the shaft to exert a thrust upon the fixed arm to vary the relative angular relationship of the adjustable arm with respect to the fixed arm, an operating part adapted to exert a thrust on the adjustable arm to actuate the fixed arm to rotate the shaft.

6. An adjustment for brake mechanism comprising, in combination with a rotatably supported brake shaft, a pair of relatively angularly arranged arms mounted on the shaft, one arm being fixed to the shaft and the other arm being angularly adjustable thereover and with respect to the first arm, said adjustable arm being in the form of a housing enclosing the fixed arm, a worm rotatably journaled within the wall of the housing and extending radially toward the shaft and provided with a ratchet upon its outer end, a stationary pawl adapted to rotate the ratchet, a nut threaded upon the worm within the housing and held upon rotation by the housing to be advanced over the worm toward the shaft to exert a thrust upon the fixed arm carried by the shaft upon rotation of the worm to vary the relative angular relationship of the adjustable arm with respect to the fixed arm.

In testimony whereof, I have hereunto signed my name.

KENNETH E. LYMAN.